US012674557B2

(12) United States Patent
Liao et al.

(10) Patent No.: US 12,674,557 B2
(45) Date of Patent: Jul. 7, 2026

(54) ILLUMINATION DEVICE

(71) Applicant: CHAMP VISION DISPLAY INC., Miao-Li County (TW)

(72) Inventors: Chun-Chien Liao, Miao-Li County (TW); Chin-Ku Liu, Miao-Li County (TW); Kuo-Lung Lin, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 19/264,920

(22) Filed: Jul. 10, 2025

(65) Prior Publication Data

US 2026/0092692 A1 Apr. 2, 2026

(30) Foreign Application Priority Data

Sep. 30, 2024 (CN) ......................... 202422396544.6

(51) Int. Cl.
*F21V 7/00* (2006.01)
*F21V 7/05* (2006.01)
*F21Y 113/00* (2016.01)

(52) U.S. Cl.
CPC ................ *F21V 7/05* (2013.01); *F21V 7/005* (2013.01); *F21Y 2113/00* (2013.01)

(58) Field of Classification Search
CPC .......... F21V 7/0008; F21V 7/005; F21V 7/05; F21K 9/27
See application file for complete search history.

(56) References Cited

U.S. PATENT DOCUMENTS

2009/0168446 A1* 7/2009 Okada ..................... F21S 43/15 362/516
2011/0058353 A1* 3/2011 Yang ......................... F21S 4/28 362/231

FOREIGN PATENT DOCUMENTS

CN 216244063 U 4/2022
CN 221127523 U 6/2024

* cited by examiner

*Primary Examiner* — Sean P Gramling

(57) ABSTRACT

An illumination device includes the following features. A substrate is located in a shell and stands next to a light outlet of the shell. A plurality of first light sources and second light sources are disposed side by side on the substrate, respectively arranged along a direction on the substrate, and adapted to respectively generate first light beams and second light beams. The second light sources are located between the first light sources and the light outlet. A reflective element is located in the shell and has a first reflective surface and a second reflective surface facing the light outlet. The first reflective surface is located on a side of the substrate far away from the light outlet, and the second reflective surface and the substrate are respectively located on two opposite side edges of the first reflective surface. The second reflective surface is inclined to the first reflective surface.

11 Claims, 6 Drawing Sheets

ILLUMINATION DEVICE

CROSS-REFERENCE TO RELATED APPLICATION

This application claims the priority benefit of China application (No. 202422396544.6), filed on Sep. 30, 2024. The entirety of the above-mentioned patent application is hereby incorporated by reference herein and made a part of this specification.

TECHNICAL FIELD

The present disclosure relates to an optical device, and more particularly to an illumination device.

BACKGROUND

Illumination devices are widely used in a wide variety of living places, and characteristics of each illumination device, such as the shape and a light outlet angle, change depending on the purpose. For example, an illumination device used for reading can mainly include a table lamp, a floor lamp, and a screen hanging lamp, and the screen hanging lamp is usually installed on an upper edge of a screen to illuminate both the screen and a desktop. The screen hanging lamp can prevent direct light emission on the screen and does not occupy additional desk space compared with a traditional table lamp and a floor lamp. In addition, when a user uses the screen hanging lamp in a writing position, light rays from the screen hanging lamp are less likely to be blocked by a user's body. Therefore, the screen hanging lamps are becoming increasingly favored by consumers in the market.

However, conventional screen hanging lamps can only be manually rotated to change an angle of light illuminating a desktop, which makes it difficult and laborious to accurately control the above angle. In addition, after the above angle is adjusted, only some of the light rays illuminate a region to be illuminated on the desktop, resulting in remaining light rays being unable to be used effectively and energy waste.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

To achieve one, some, or all of the above objectives or other objects, an embodiment of the present disclosure provides an illumination device, including a shell, a substrate, a plurality of first light sources, a plurality of second light sources, and a reflective element. The shell is provided with a light outlet. The substrate is located in the shell and stands next to the light outlet. The first light sources are arranged on the substrate along a direction and adapted to generate first light beams. The second light sources are arranged on the substrate along the direction, the second light sources and the first light sources are arranged side by side on the substrate, and the second light sources are located between the first light sources and the light outlet. The second light sources are adapted to generate second light beams. The reflective element is located in the shell and has a first reflective surface and a second reflective surface. The first reflective surface is located on a side of the substrate far away from the light outlet. The second reflective surface and the substrate are respectively located on two opposite side edges of the first reflective surface, and the first reflective surface and the second reflective surface face the light outlet. The second reflective surface is inclined relative to the first reflective surface. The first light sources and the second light sources are together located in accommodation space formed by the substrate and the reflective element, the first reflective surface is adapted to reflect a chief ray of the first light beam to the light outlet, and the second reflective surface is adapted to reflect a chief ray of the second light beam to the light outlet.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
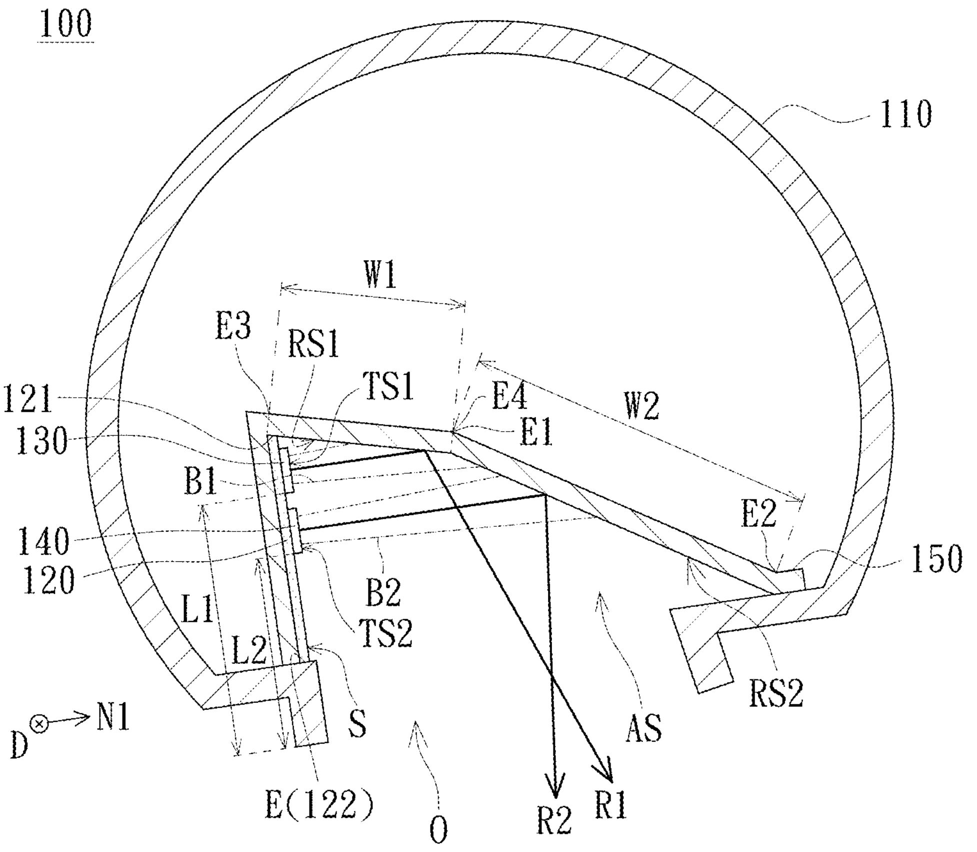
FIG. 1 is a schematic sectional view of an illumination device according to an embodiment of the present disclosure.
Figure 2:
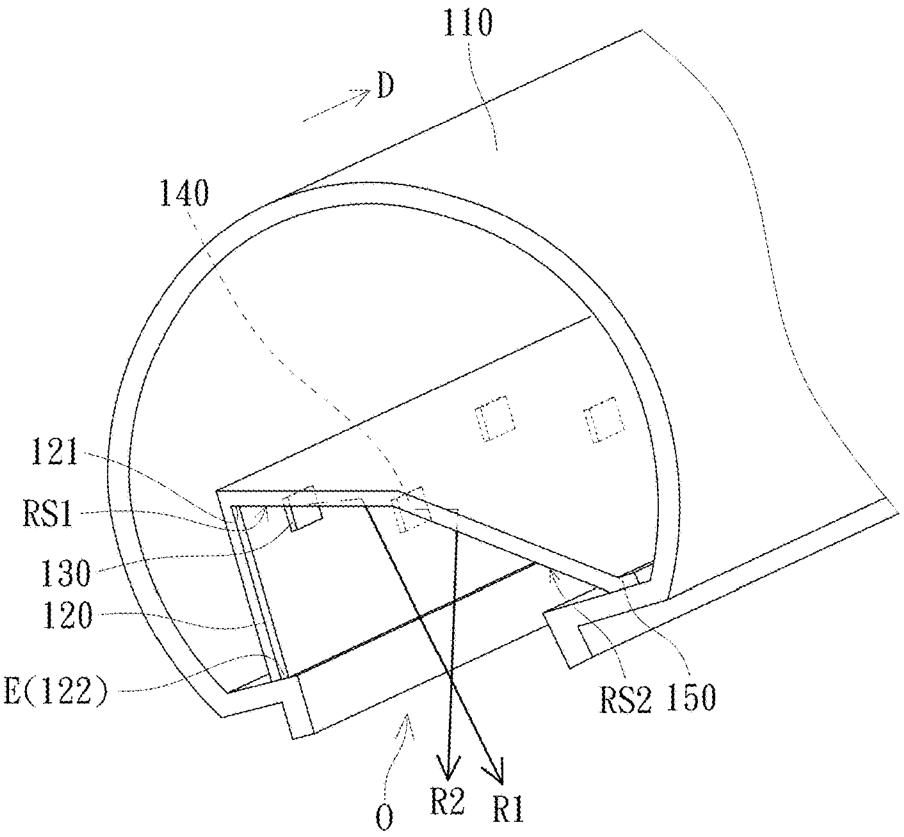
FIG. 2 is a schematic partially three-dimensional diagram of the illumination device in FIG. 1.
Figure 3:
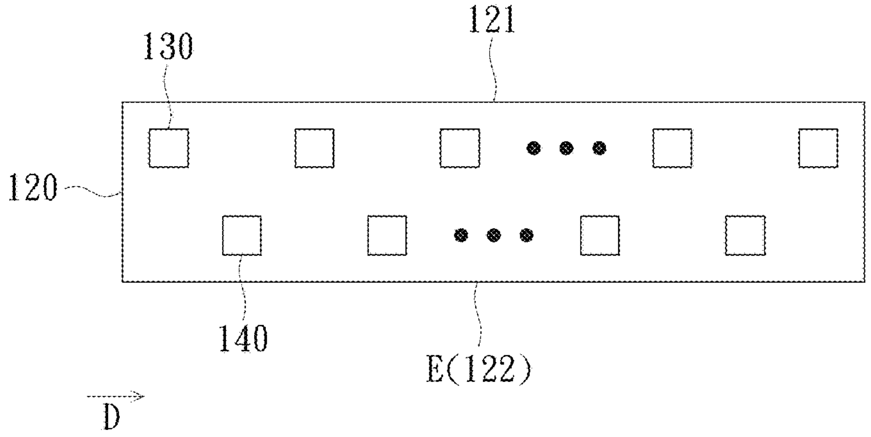
FIG. 3 is a schematic top view of a substrate, a first light source, and a second light source in FIG. 1.

FIG. 1 is a schematic sectional view of an illumination device according to an embodiment of the present disclosure. FIG. 2 is a schematic partially three-dimensional diagram of the illumination device in FIG. 1. FIG. 3 is a schematic top view of a substrate, a first light source, and a second light source in FIG. 1. First, refer to FIG. 1 and FIG. 2. The illumination device 100 includes a shell 110, a substrate 120, a plurality of first light sources 130, a plurality of second light sources 140, and a reflective element 150. The shell 110 is provided with a light outlet O. The substrate 120 is located in the shell 110 and stands next to the light outlet O. The first light sources 130 are arranged on the substrate 120 along a direction D (also drawn in FIG. 3) and are adapted to generate first light beams B1 (in FIG. 1, two dotted lines represent an outer diameter of the first light beam B1 generated by the first light source 130). The second light sources 140 are arranged on the substrate 120 along the direction D, the second light sources 140 and the first light sources 130 are arranged side by side on the substrate 120, and the second light sources 140 are located between the first light sources 130 and the light outlet O. The second light sources 140 are adapted to generate second light beams B2 (in FIG. 1, two dotted lines represent an outer diameter of the second light beam B2 generated by the second light source 140). The reflective element 150 is located in the shell 110 and has a first reflective surface RS1 and a second reflective surface RS2. The first reflective surface RS1 is located on a side of the substrate 120 far away from the light outlet O. The second reflective surface RS2 and the substrate 120 are respectively located on two opposite side edges of the first reflective surface RS1, and the first reflective surface RS1 and the second reflective surface RS2 face the light outlet O. The second reflective surface RS2 is inclined relative to the first reflective surface RS1. The first light sources 130 and the second light sources 140 are together located in accommodation space AS formed by the substrate 120 and the reflective element 150, the first reflective surface RS1 is adapted to reflect a chief ray R1 of the first light beam B1 to the light outlet O, and the second reflective surface RS2 is adapted to reflect a chief ray R2 of the second light beam B2 to the light outlet O.

It should be noted that the illumination device 100 in this embodiment is, for example, a screen hanging lamp. However, in other embodiments, the illumination device 100 may include a table lamp, a floor lamp, or the like, which is not specifically limited in the present disclosure.

In this embodiment, the chief ray R1 of the first light source 130 may be a light ray with the strongest light intensity in the first light beams B1 or a light ray located at a central axis of the first light beams B1. In this embodiment, the light ray in the central axis of the first light beams B1 is used as an example of the chief ray R1. The chief ray R2 of the second light beam B2 is defined in a similar manner in which the chief ray R1 of the first light beam B1 is defined, and the chief ray R2 is, for example, a light ray in a central axis of the second light beams B2 in this embodiment. It is worth noted that there is not any mechanical component, between the first light source 130 and the second light source 140, that can reflect or block light rays. In this manner, before the first light beams B1 and the second light beams B2 are respectively incident on the first reflective surface RS1 and the second reflective surface RS2, transmission paths of the first light beams B1 and the second light beams B2 are not significantly affected by interference of the above mechanical component, thereby simplifying optical path design of the illumination device 100 and making it easy to change a light emission field pattern of the illumination device 100 according to different needs. In addition, because the above mechanical component is not disposed between the first light source 130 and the second light source 140, some of the first light beams B1 can be directly incident on the second reflective surface RS2, and some of the second light beams B2 can also be directly incident on the first reflective surface RS1. Specifically, each of the first light sources 130 has a top surface TS1 facing away from the substrate 120, and each of the second light sources 140 has a top surface TS2 facing away from the substrate 120. Some of the first light beams B1 are emitted from the first light sources 130, and can directly pass between the top surface TS2 of the second light source 140 and the second reflective surface RS2 and then be incident on the second reflective surface RS2. Similarly, in an embodiment, some of the second light beams B2 are emitted from the second light sources 140, and can directly pass between the top surface TS1 of the first light source 130 and the first reflective surface RS1 and then be incident on the first reflective surface RS1. In this manner, various light emission field patterns of the illumination device 100 can be provided, enabling the illumination device 100 to be more widely used.

Refer to FIG. 2 and FIG. 3. The first light sources 130 and the second light sources 140 in this embodiment are, for example, light-emitting diodes (LEDs). By the way, the first light sources 130 and the second light sources 140 can be arranged alternately to increase space around each first light source 130 and each second light source 140, thus allowing for more flexible selection of sizes of the first light sources 130 and the second light sources 140. For example, the substrate 120 may have a first side 121 and a second side 122 (both labeled in FIG. 1). The first side 121 is opposite to the second side 122, and a surface S of the substrate 120 connects the first side 121 and the second side 122. The second side 122 is fixed next to the light outlet O, so that the substrate 120 stands next to the light outlet O. Each first light source 130 and each second light source 140 may be completely staggered in a direction from the first side 121 to the second side 122, which is not limited thereto. In another embodiment, each first light source 130 and each second light source 140 may partially overlap in the above direction. Quantities of the first light sources 130 and the second light sources 140 and spacings between the first light sources 130 and the second light sources 140 can be changed according to actual needs, which is not limited in the present disclosure. In this embodiment, the first light sources 130 and the second light sources 140 may be arranged approximately along side edges of the first side 121 and the second side 122 of the substrate 120 respectively. Further, the first light sources 130 and the second light sources 140 are located between the first side 121 and the second side 122, and an angle between the direction D and a side edge E of the second side 122 can be 0° to 10°. For example, the angle in this embodiment may be approximately 0°, meaning that a plurality of first light sources 130 and a plurality of second light sources 140 may be arranged along a direction D that is substantially parallel to the side edge E. Still refer to FIG. 1. A shortest distance L1 between the first light source 130 and the light outlet O may be greater than a shortest distance L2 between the second light source 140 and the light outlet O. In other words, the first light source 130 can be farther away from the light outlet O than the second light source 140, so that most of the first light beams B1 can be incident on the first reflective surface RS1, and most of the second light beams B2 can be incident on the second reflective surface RS2.

The material of the reflective element 150 may include metal and may have an integrated structure. For example, the reflective element 150 may include two plates that are connected, the first reflective surface RS1 and the second reflective surface RS2 are located on one of the plates, and the substrate 120 may be fixed on the other of the plates. In this embodiment, the first reflective surface RS1 may be located at least on transmission paths of the first light beams B1, and the second reflective surface RS2 may be located at least on transmission paths of the second light beams B2. For example, the second reflective surface RS2 can overlap each second light source 140 in a normal direction N1 of each top surface TS2 of each second light source 140, to ensure that the chief ray R2 of the second light beam B2 is incident on the second reflective surface RS2. In addition, the second reflective surface RS2 can also be located on some of the transmission paths of the first light beams B1. For example, the chief ray R1 of the first light beam B1 can be incident on the first reflective surface RS1, and some light rays other than the chief ray R1 of the first light beam B1 can be incident on the second reflective surface RS2. It can be understood that in an embodiment, the first reflective surface RS1 and the second reflective surface RS2 may be both located on the transmission paths of the first light beams B1 and the transmission paths of the second light beams B2. Similarly, the first reflective surface RS1 can also be located on some of the transmission paths of the second light beams B2. In another embodiment, the first light beams B1 may be incident on the first reflective surface RS1 but not on the second reflective surface RS2, while in another embodiment, the second light beams B2 may be incident on the second reflective surface RS2 but not on the first reflective surface RS1.

Further, the second reflective surface RS2 in this embodiment may have a first edge E1 and a second edge E2 that are opposite to each other, and the first reflective surface RS1 may have a third edge E3 and a fourth edge E4 that are opposite to each other. The first edge E1 is connected to the fourth edge E4, and the third edge E3 is connected to the substrate 120, which is not limited thereto. In other embodiments, the third edge E3 may not be connected to the substrate 120. In this embodiment, the first reflective surface RS1 has a first width W1 between the third edge E3 and the fourth edge E4, and the second reflective surface RS2 has a second width W2 between the first edge E1 and the second edge E2. The first width W1 is, for example, smaller than the second width W2, so that the first reflective surface RS1 can be more accurately located on a transmission path of the chief ray R1 of the first light beam B1, and the second reflective surface RS2 can be more accurately located on a transmission path of the chief ray R2 of the second light beam B2.

By the way, for example, the first edge E1 of the second reflective surface RS2 overlaps the fourth edge E4 of the first reflective surface RS1. In this embodiment, the first edge E1 is connected to a side of the first reflective surface RS1 far away from the substrate 120, the second edge E2 is connected to the shell 110, and the second edge E2 and the substrate 120 are located on two opposite sides of the light outlet O respectively. In this manner, the first light beams B1 and the second light beams B2 can be prevented from emitting between the shell 110 and the reflective element 150, thereby improving a light utilization rate. Similarly, the first reflective surface RS1 can block the first light source 130 and the second light source 140 from the first side 121 of the substrate 120, to prevent the first light beam B1 and the second light beam B2 from emitting between the first reflective surface RS1 and the first side 121, thereby further improving the light utilization rate. In this embodiment, the reflective element 150 can be adjacent to the substrate 120 and the shell 110. Because the reflective element 150 has an integrated structure, the second reflective surface RS2 can be adjacent to the first reflective surface RS1 to ensure that the reflective element 150 can reflect all the first light beams B1 and second light beams B2 to the light outlet O. By the way, the first reflective surface RS1 and the second reflective surface RS2 can each include a flat surface, so that a manufacturing process of the reflective element 150 can be simplified, and manufacturing costs for the reflective element 150 can be further reduced. In an embodiment, the first reflective surface RS1 and the second reflective surface RS2 may each include a curved surface or a parabolic surface.

The substrate 120 in this embodiment may include a circuit board for electrically connecting the first light source 130 and the second light source 140. The first light source 130 and the second light source 140 are disposed on a surface S of the substrate 120, and the surface S may include a reflective surface to further enhance the light utilization rate.

The shell 110 can be roughly cylindrical. However, the shape of the shell 110 can be changed according to a purpose of the illumination device 100, which is not specifically limited in the present disclosure.

Compared with conventional technologies, in the illumination device 100 of this embodiment, the chief ray R1 of the first light beam B1 and the chief ray R2 of the second light beam B2 are respectively reflected to the light outlet O by the first reflective surface RS1 and the second reflective surface RS2 with different inclinations, so that the chief ray R1 of the first light beam B1 and the chief ray R2 of the second light beam B2 can emit from the light outlet O at different angles, thereby providing different illumination ranges. Therefore, the illumination device 100 can provide different illumination ranges by turning on the first light source 130 and/or the second light source 140, which not only saves effort and accurately changes the illumination angle of the illumination device 100, but also ensures that most light rays emitting from the illumination device 100 are incident into a region with illumination requirements, thereby improving the light utilization rate. In addition, because the first light sources 130 and the second light sources 140 are located in the same accommodation space AS, apart from the first reflective surface RS1 and the second reflective surface RS2, there is no other structural component in the accommodation space AS that significantly changes the transmission paths of the first light beams B1 and the transmission paths of the second light beams B2, thereby effectively simplifying optical path design of the illumination device 100. In this manner, emission angles of the first light beams B1 and the second light beams B2 can be more easily and accurately adjusted according to different needs, so that the illumination device 100 in this embodiment is widely applicable.

Figure 4:
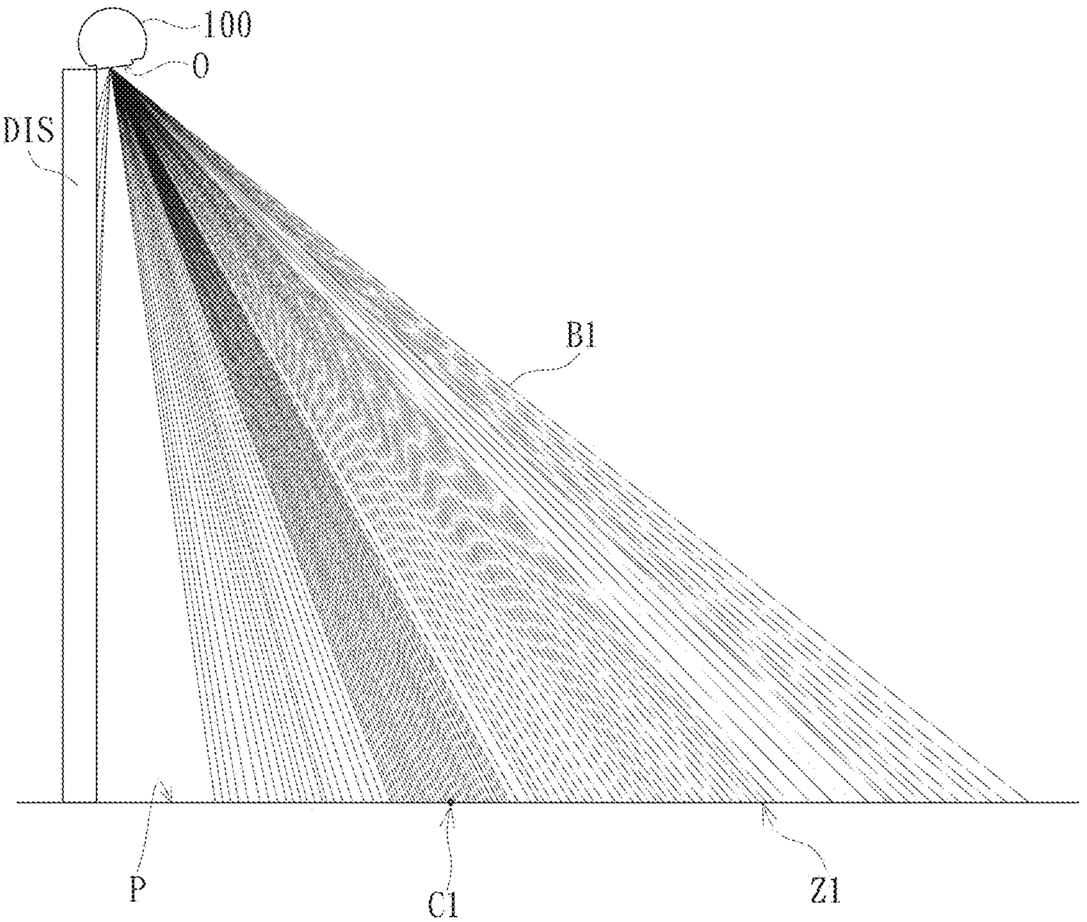
FIG. 4 is a schematic diagram of first light beams emitted by the illumination device in FIG. 1.
Figure 5:
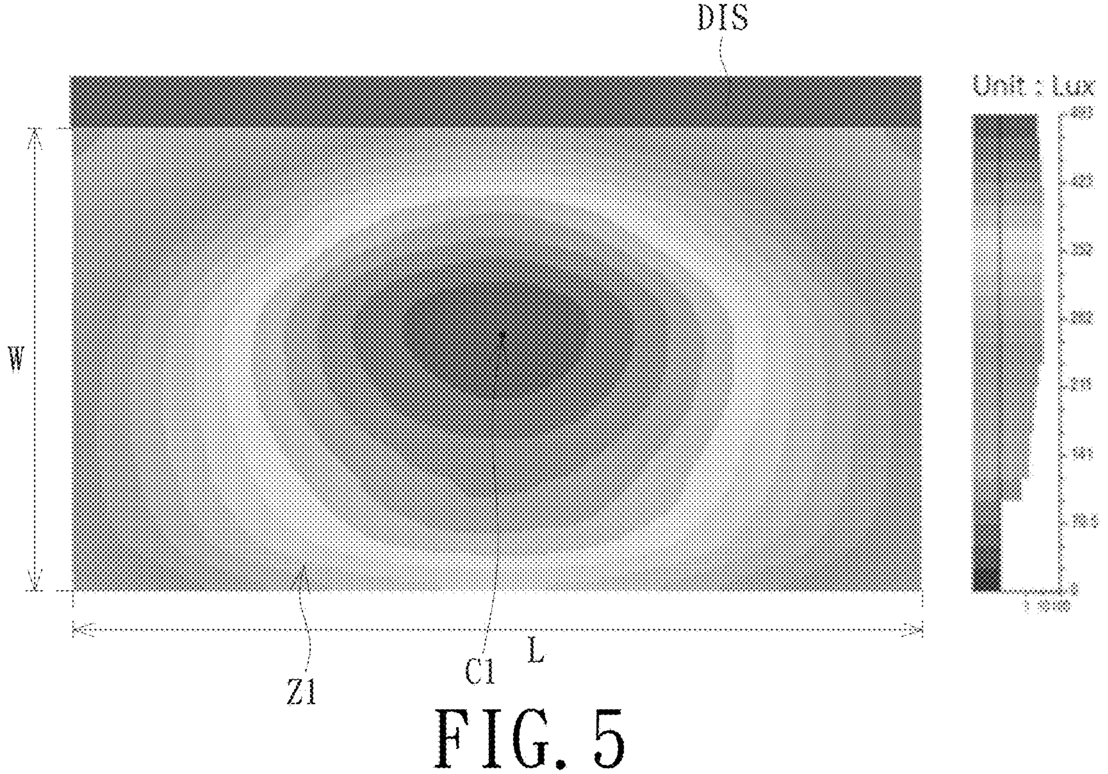
FIG. 5 is a schematic diagram of distribution of the illuminance of the first light beams in FIG. 4.
Figure 6:
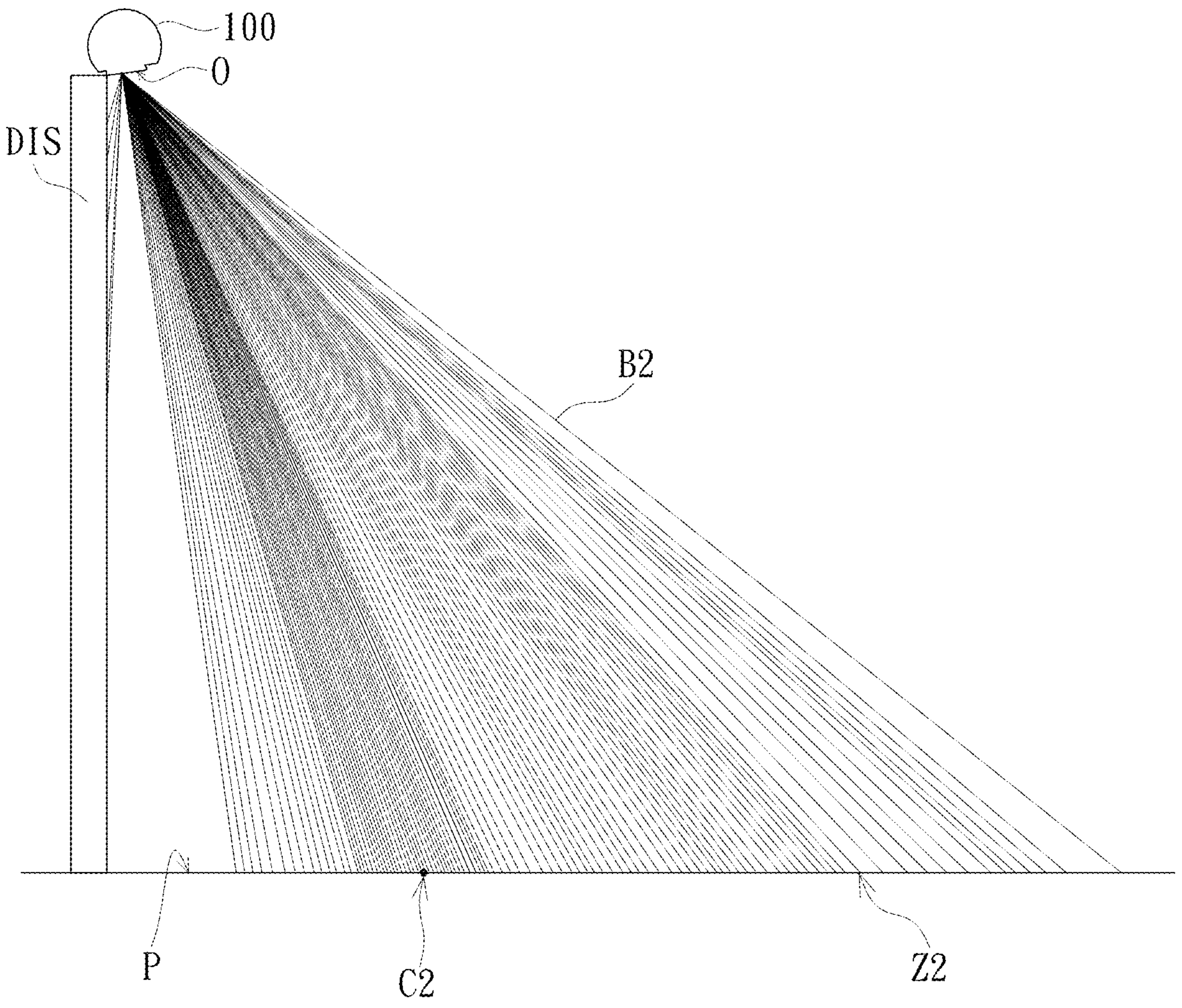
FIG. 6 is a schematic diagram of second light beams emitted by the illumination device in FIG. 1.
Figure 7:
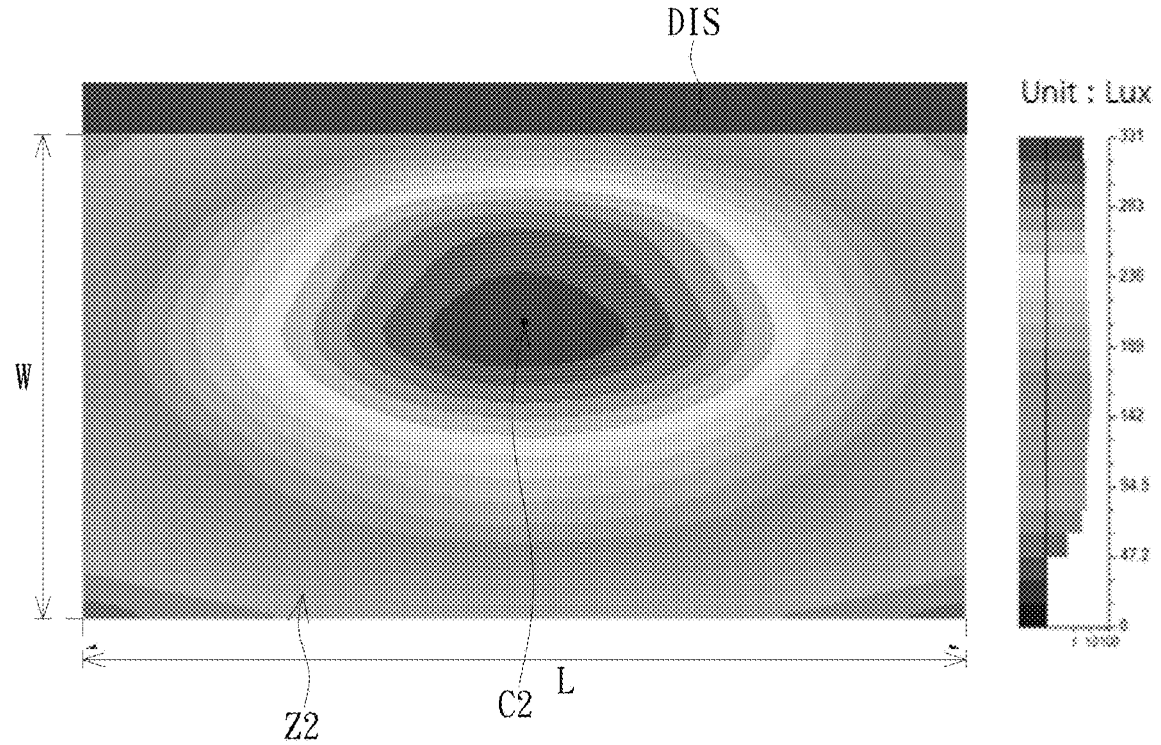
FIG. 7 is a schematic diagram of distribution of the illuminance of the second light beams in FIG. 6.

FIG. 4 is a schematic diagram of first light beams emitted by the illumination device in FIG. 1. FIG. 5 is a schematic diagram of distribution of illuminance of the first light beams in FIG. 4. FIG. 6 is a schematic diagram of second light beams emitted by the illumination device in FIG. 1. FIG. 7 is a schematic diagram of distribution of illuminance of the second light beams in FIG. 6. FIG. 4 and FIG. 6 roughly illustrate the first light beams B1 and the second light beams B2 emitted by the illumination device 100, but actual light emission of the illumination device 100 is not limited to FIG. 4 and FIG. 6. First refer to FIG. 4 and FIG. 6. In this embodiment, the first light beams B1 and the second light beams B2 are adapted to illuminate a reference surface P after emitting through the light outlet O, and a distance between a center point C1 of the first light beams B1 in an illumination region Z1 of the reference surface P and the light outlet O may be greater than a distance between a center point C2 of the second light beams B2 in an illumination region Z2 of the reference surface P and the light outlet O. In detail, the illumination region Z1 and the illumination region Z2 may be all regions of the reference surface P illuminated by the first light beams B1 and the second light beams B2 respectively. The center point C1 and the center point C2 may be positions at which the first light beam B1 and the second light beam B2 have the greatest illuminance on the reference surface P respectively.

The illumination device 100 in this embodiment may be disposed on an upper edge of a display device DIS, and the reference surface P may be a desktop to be illuminated by the illumination device 100. Specifically, with reference to FIG. 1 and FIG. 4, when the first light source 130 is turned on and the second light source 140 is turned off, most of the first light beams B1 are reflected by the first reflective surface RS1 and emit from the light outlet O at a larger angle, thereby illuminating a region on the reference surface P far away from the display device DIS (or the light outlet O). Therefore, as shown in FIG. 4 and FIG. 5, the center point C1 of the first light beam B1 in the illumination region Z1 of the reference surface P is farther away from the display device DIS. In addition, with reference to FIG. 1 and FIG. 6, when the second light source 140 is turned on and the first light source 130 is turned off, most of the second light beams B2 are reflected by the second reflective surface RS2 and emit from the light outlet O at a smaller angle, thereby illuminating a region closer to the display device DIS (or the light outlet O) on the reference surface P. Therefore, as shown in FIG. 6 and FIG. 7, the center point C2 of the second light beam B2 in the illumination region Z2 on the reference surface P is closer to the display device DIS. Although the display device DIS in FIG. 5 and FIG. 7 is adjacent to the illumination region Z1 and the illumination region Z2, this is only for understanding a correspondence of the illuminance distribution relative to the display device DIS, and is not intended to limit distances between the two.

Figure 8:
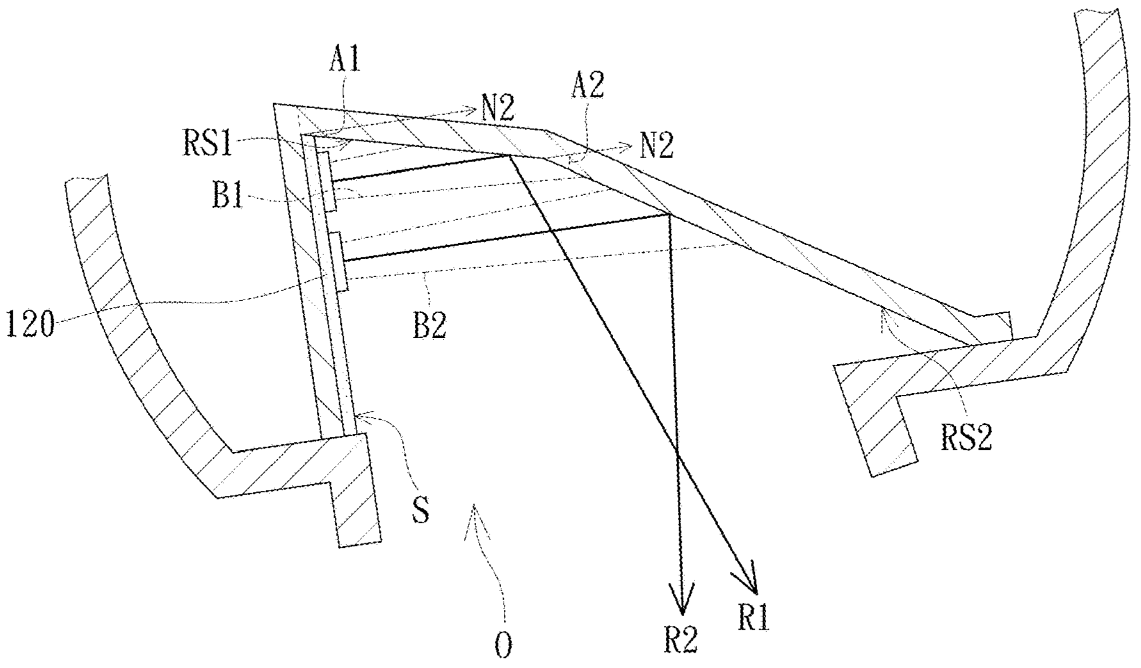
FIG. 8 is a schematic partially enlarged diagram of the illumination device in FIG. 1.

FIG. 8 is a schematic partially enlarged diagram of the illumination device in FIG. 1. Further, refer to FIG. 8. There is a first angle A1 between the first reflective surface RS1 and a normal direction N2 of the surface S of the substrate 120, and there is a second angle A2 between the second reflective surface RS2 and the normal direction N2 of the surface S. The first angle A1 is, for example, less than the second angle A2. In this way, most of the first light beams B1 (such as the chief rays R1) can emit from the light outlet O at a larger angle after being reflected by the first reflective surface RS1, thereby illuminating a region on the reference surface P (shown in FIG. 4) farther away from the light outlet O. Similarly, most of the second light beams B2 (such as the chief rays R2) can emit from the light outlet O at a smaller angle after being reflected by the second reflective surface RS2, thereby illuminating a region on the reference surface P (shown in FIG. 6) closer to the light outlet O. In an embodiment, the first angle A1 is, for example, between 0° and 50°. In another embodiment, the first angle A1 may be approximately 12°. Similarly, the second angle A2 can be between 0° and 65°, and is, for example, approximately 27°. It can be understood that specific values of the first angle A1 and the second angle A2 can be changed according to actual needs, which is not specifically limited in the present disclosure.

Figure 9:
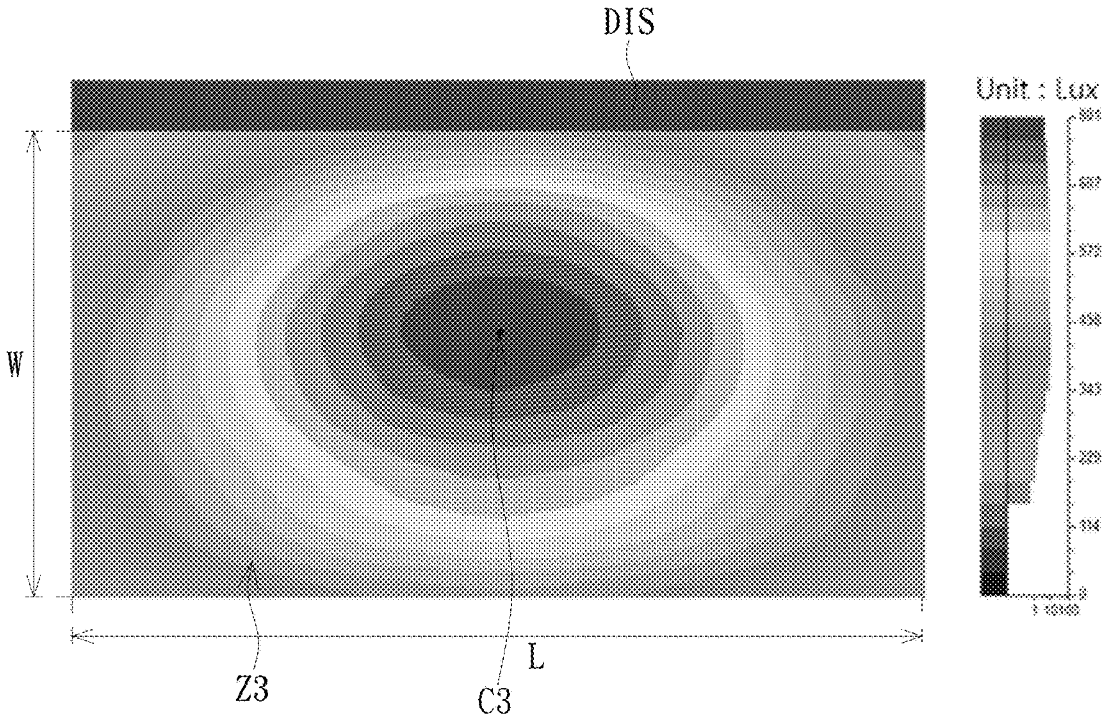
FIG. 9 is a schematic diagram of distribution of the illuminance formed by the first light beams and the second light beams in FIG. 1.

FIG. 9 is a schematic diagram of distribution of the illuminance formed by the first light beams and the second light beams in FIG. 1. Refer to FIG. 5, FIG. 7, and FIG. 9. In this embodiment, when the first light source 130 and the second light source 140 are simultaneously turned on, a distance between a center point C3 of the first light beam B1 and the second light beam B2 in an illumination region Z3 of the reference surface P (shown in FIG. 4 and FIG. 6) and the light outlet O (shown in FIG. 4 and FIG. 6) may be between the center point C1 and the center point C2. In other words, the illumination device 100 can provide at least three different illuminance distributions as shown in FIG. 5, FIG. 7, and FIG. 9. In this embodiment, the first light source 130 with a total luminous flux of approximately 400 lm and the second light source 140 with a total luminous flux of approximately 200 lm can be used to form illumination distribution diagrams shown in FIG. 5, FIG. 7, and FIG. 9 respectively, which is not specifically limited in the present disclosure. By the way, in an embodiment, the illumination distribution diagrams in FIG. 5, FIG. 7, and FIG. 9 show that lengths L of the illumination region Z1, the illumination region Z2, or the illumination region Z3 can be approximately 850 mm, and each of widths W thereof can be approximately 500 mm, which are also not specifically limited in the present disclosure.

Figure 10:
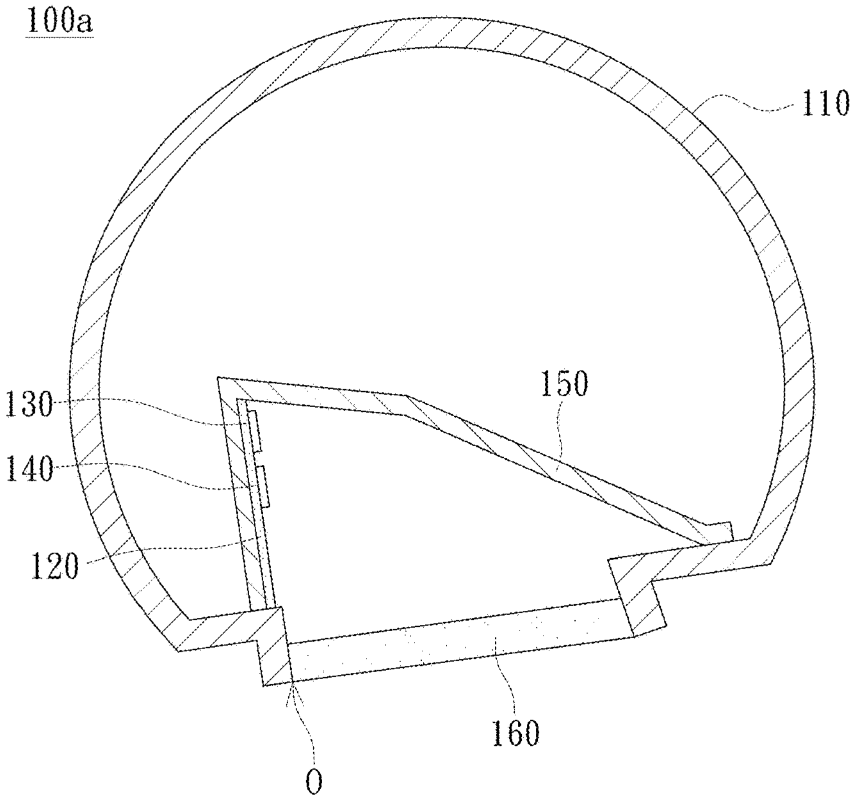
FIG. 10 is a schematic sectional view of an illumination device according to another embodiment of the present disclosure.

FIG. 10 is a schematic sectional view of an illumination device according to another embodiment of the present disclosure. A structure and advantages of the illumination device 100*a* in this embodiment are similar to the structure and advantages in FIG. 1, and only differences are illustrated below. Refer to FIG. 10. The illumination device 100*a* further includes, for example, a light transmission plate 160, and the light transmission plate 160 is disposed at a light outlet O of a shell 110. The light transmission plate 160 in this embodiment includes, for example, a transparent plate. In an embodiment, the light transmission plate 160 may have a rough surface or be provided with diffusion particles internally, to provide a function of diffusing light rays, making light rays emitted by the illumination device 100*a* more uniform.

To sum up, the illumination device in embodiments of the present disclosure has at least one of the following advantages. In the illumination device of the present disclosure, the chief ray of the first light beam and the chief ray of the second light beam are respectively reflected to the light outlet through the first reflective surface and the second reflective surface with different inclinations, so that the chief ray of the first light beam and the chief ray of the second light beam can emit from the light outlet at different angles, thereby providing different illumination ranges. Therefore, the illumination device can provide different illumination ranges by turning on the first light source and/or the second light source, which not only saves effort and accurately changes the illumination angle of the illumination device, but also ensures that most light rays emitting from the illumination device enter a region with illumination requirements, thereby improving the light utilization rate. In addition, because the first light sources and the second light sources are located in the same accommodation space, apart from the first reflective surface and the second reflective surface, there is no other structural component in the accommodation space that significantly changes the transmission paths of the first light beams and the transmission paths of the second light beams, thereby effectively simplifying optical path design of the illumination device. In this manner, emission angles of the first light beams and the second light beams can be more easily and accurately adjusted according to different needs, so that the illumination device in the present disclosure is widely applicable.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination device, comprising:

a shell, provided with a light outlet;

a substrate, located in the shell and standing next to the light outlet;

a plurality of first light sources, arranged on the substrate along a direction and adapted to generate a first light beam;

a plurality of second light sources, arranged on the substrate along the direction, wherein the second light sources and the first light sources are arranged side by side on the substrate, the second light sources are located between the first light sources and the light outlet, and the second light sources are adapted to generate a second light beam; and a reflective element, located in the shell and having a first reflective surface and a second reflective surface, wherein the first reflective surface is located on a side of the substrate opposite to the light outlet, the second reflective surface and the substrate are respectively located on two opposite side edges of the first reflective surface, the first reflective surface and the second reflective surface face the light outlet, the second reflective surface is inclined relative to the first reflective surface, the first light sources and the second light sources are together located in an accommodation space formed by the substrate and the reflective element, the first reflective surface is adapted to reflect a chief ray of the first light beam to the light outlet, and the second reflective surface is adapted to reflect a chief ray of the second light beam to the light outlet;

wherein a shortest distance between the first light source and the light outlet is greater than a shortest distance between the second light source and the light outlet;

wherein each of the first light sources has a top surface facing away from the substrate, and the first reflective surface overlaps each of the first light sources in a normal direction of each of the top surfaces of the first light sources;

wherein each of the second light sources has a top surface facing away from the substrate, and the second reflective surface totally overlaps each of the second light sources in a normal direction of each of the top surfaces of the second light sources.

2. The illumination device according to claim 1, wherein the substrate has a first side and a second side, the first side is opposite to the second side, the second side is fixed next to the light outlet, the first light sources and the second light sources are located between the first side and the second side, and an angle between the direction and a side edge of the second side is 0° to 10°.

3. The illumination device according to claim 1, wherein the second reflective surface has a first edge and a second edge, the first edge is opposite to the second edge, the first edge is connected to a side of the first reflective surface far away opposite to the substrate, the second edge is connected to the shell, and the second edge and the substrate are located on two opposite sides of the light outlet.

4. The illumination device according to claim 1, wherein the second reflective surface has a first edge and a second edge that are opposite to each other, the first reflective surface has a third edge and a fourth edge that are opposite to each other, the first edge is connected to the fourth edge, the third edge is connected to the substrate, the first reflective surface has a first width between the third edge and the fourth edge, the second reflective surface has a second width between the first edge and the second edge, and the first width is smaller than the second width.

5. The illumination device according to claim 1, wherein the first light sources and the second light sources are disposed on a surface of the substrate, a first angle is formed between the first reflective surface and a normal direction of the surface, a second angle is formed between the second reflective surface and the normal direction of the surface, and the first angle is smaller than the second angle.

6. The illumination device according to claim 5, wherein the first angle is between 0° and 50°.

7. The illumination device according to claim 5, wherein the second angle is between 0° and 65°.

8. The illumination device according to claim 1, wherein the first reflective surface and the second reflective surface each comprise a plane.

9. The illumination device according to claim 1, wherein the first light sources and the second light sources are disposed on a surface of the substrate, and the surface comprises a reflective surface.

10. The illumination device according to claim 1, further comprising a light transmission plate, wherein the light transmission plate is disposed at the light outlet of the shell.

11. The illumination device according to claim 1, wherein the first light beams and the second light beams are adapted to illuminate a reference surface after emitting through the light outlet, and a distance between a center point of the first light beam in an illumination region of the reference surface and the light outlet is greater than a distance between a center point of the second light beam in the illumination region of the reference surface and the light outlet.

* * * * *